(12) United States Patent
Levy

(10) Patent No.: US 9,980,429 B2
(45) Date of Patent: May 29, 2018

(54) LIQUID APPLICATOR ATTACHMENT FOR A SEED PLANTER

(71) Applicant: Precision Planting LLC, Tremont, IL (US)

(72) Inventor: Kent Levy, Morton, IL (US)

(73) Assignee: Precision Planting LLC, Tremont, IL (US)

(*) Notice: Subject to any disclaimer, the term of this patent is extended or adjusted under 35 U.S.C. 154(b) by 128 days.

(21) Appl. No.: 15/063,456

(22) Filed: Mar. 7, 2016

(65) Prior Publication Data

US 2016/0255770 A1    Sep. 8, 2016

Related U.S. Application Data

(60) Provisional application No. 62/129,420, filed on Mar. 6, 2015.

(51) Int. Cl.
*A01C 7/06* (2006.01)
*A01C 7/20* (2006.01)
*A01C 23/02* (2006.01)

(52) U.S. Cl.
CPC .............. *A01C 23/023* (2013.01); *A01C 7/06* (2013.01); *A01C 7/20* (2013.01)

(58) Field of Classification Search
CPC .... A01C 7/06; A01C 7/00; A01C 7/20; A01C 23/023; A01C 23/02; A01C 23/00
See application file for complete search history.

(56) References Cited

U.S. PATENT DOCUMENTS

| 7,096,805 | B1 | 8/2006 | Wiesenburger |
| 7,128,007 | B1 | 10/2006 | Wiesenburger |
| 8,561,472 | B2 | 10/2013 | Sauder et al. |
| 8,634,992 | B2 | 1/2014 | Sauder et al. |
| 8,789,482 | B2 | 7/2014 | Garner et al. |
| 8,978,564 | B2 | 3/2015 | Hagny |
| 8,985,037 | B2 | 3/2015 | Radtke et al. |
| 9,144,189 | B2 | 9/2015 | Stoller et al. |
| 9,414,538 | B1 | 8/2016 | Nelson |
| 9,675,005 | B1 | 6/2017 | Bergmeier |
| 2007/0039528 | A1* | 2/2007 | Sauder .................. A01C 7/126 111/171 |

(Continued)

FOREIGN PATENT DOCUMENTS

| WO | 2012129442 A2 | 9/2012 |
| WO | 2012149415 A1 | 11/2012 |
| WO | 2013022835 A1 | 2/2013 |

OTHER PUBLICATIONS

Shield Agricultural Equipment, Innovation in Precision Agriculture Catalog, 2016.

(Continued)

*Primary Examiner* — Christopher J. Novosad
(74) *Attorney, Agent, or Firm* — Thomas J. Oppold; Larkin Hoffman Daly & Lindgren, Ltd.

(57) ABSTRACT

A liquid applicator having a main body adapted to removably, rigidly mount to a lower end of a shank of a row unit between the furrow opening discs and forward of the seed delivery apparatus relative to a direction of travel of the row unit. The main body supports a liquid conduit in fluid communication with a liquid source, the conduit disposed to deposit liquid into the seed furrow forward of the seed delivery apparatus.

6 Claims, 11 Drawing Sheets

(56) References Cited

U.S. PATENT DOCUMENTS

2009/0308296 A1    12/2009  Senchuk
2013/0000534 A1    1/2013  Schaffert
2014/0158031 A1*  6/2014  Hagny ................... A01C 5/06
                                                                                 111/121

OTHER PUBLICATIONS

"John Deere Starter Fertilizer Placement Tube Part #TT-006"; available at <http://http://www.totally-tubular.net/tt006>; Totally Tubular MFG, Inc., Aberdeen, SD; Oct. 23, 2011; 1 page.
"Fertilizer Placement Below the Seed"; Brochure; SureFire Ag Systems, Inc., Atwood, KS; Feb. 20, 2016; 1 page.

* cited by examiner

LIQUID APPLICATOR ATTACHMENT FOR A SEED PLANTER

BACKGROUND

It is desirable to apply certain types of liquid product (i.e., fertilizer, herbicides, pesticides) in close proximity to planted seeds. It is also desirable to apply liquid product to seeds during planting operations to improve efficiency and minimize production costs.

DESCRIPTION

Figure 1:
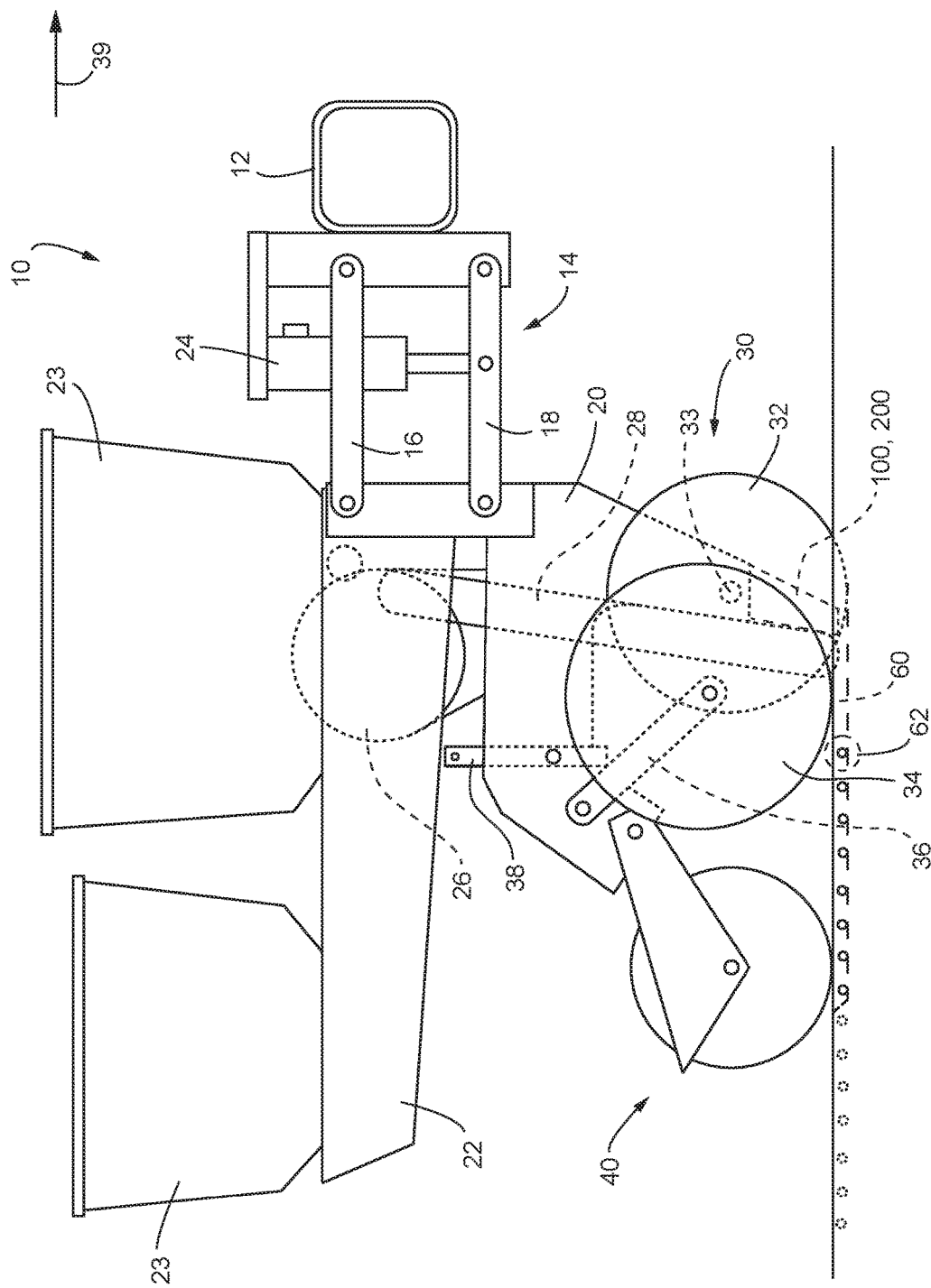
FIG. 1 is a side elevation view of an embodiment of a row unit of a seed planter showing an embodiment of the liquid applicator attachment mounted to the shank of the row unit frame member.

Referring now to the drawings, wherein like reference numerals designate identical or corresponding parts throughout the several views, FIG. 1 illustrates a side elevation view of an embodiment of row unit 10 of a row crop planter. As is well known in the art, the row units 10 are mounted in spaced relation along the length of a transverse toolbar 12 by a parallel linkage 14, comprised of upper and lower parallel arms 16, 18 pivotally mounted at their forward ends to the transverse toolbar 12 and at their rearward end to the row unit frame members 20, 22. The parallel linkage 14 permits each row unit 10 to move vertically independently of the toolbar 12 and the other spaced row units in order to adjust to changes in terrain or upon encountering obstructions as the planter is drawn through the field. An actuator 24 may be provided to apply lift and/or downforce on the row unit 10, such as disclosed in U.S. Pat. Nos. 8,634,992 and 9,144,189 and International Publication No. WO2013/022,835, the disclosures of which are incorporated herein by reference.

The row unit 10 includes a lower frame member 20 and an upper frame member 22. The upper frame member 22 supports one or more hoppers 23, a seed meter 26 and a seed delivery apparatus 28 such as a seed tube, as is well known in the art, or a seed conveyor such as disclosed in U.S. Pat. Nos. 8,985,037 and/or 8,789,482. The seed meter 26 may be a vacuum-type seed meter having common operating principles with the seed meter embodiments as disclosed in International Publication No. WO2012/129,442, the disclosure of which is incorporated herein by reference. The seed meter 26 may be powered by a meter drive configured to drive a seed disc within the seed meter. In other embodiments, the drive may comprise a hydraulic drive configured to drive the seed disc.

The lower frame member 20 operably supports a furrow opening assembly 30 and a furrow closing assembly 40. The furrow opening assembly 30 comprises a pair of furrow opener discs 32 and a pair of gauge wheels 34. The furrow opener discs 32 are rotatably secured to shafts 33 (FIG. 2) extending from the downwardly extending shank 42 of the lower frame member 20. The gauge wheels 34 are pivotally secured to the lower frame member 20 by gauge wheel arms 36. A depth adjuster 38 is adjustably moveable to limit the upward travel of the gauge wheel arms 36 and thus the upward travel of the gauge wheels 34 with respect to the opening discs 32 to adjust the furrow depth. As is well known in the art, the depth adjuster 38 may be a mechanical lever adjustably positionable within slots 41 (FIG. 2) on the lower frame member 20 to set different stop positions for the gauge wheel arms 36. Alternatively, the depth adjuster 38 may be an actuator (not shown) such as disclosed in International Publication No. WO2012/149,415 that is actuated based on the amount of downforce detected by a downforce sensor imposed by the gauge wheels 34 on the soil such as disclosed in U.S. Pat. No. 8,561,472, both of the disclosures of which are incorporated herein by reference.

In operation, as the row unit 10 is lowered to the planting position, the opener discs 32 penetrate into the soil. The soil forces the gauge wheels 34 to pivot upwardly until the gauge wheel arms 36 abut or contact the stop position previously set by the depth adjuster 38. As the planter is drawn forwardly in the direction indicated by arrow 39, the furrow opener discs 32 cut a V-shaped furrow or trench 60 into the soil while the gauge wheels 34 compact the soil to aid in formation of the V-shaped furrow. Individual seeds 62 from the seed hopper 23 are dispensed by the seed meter 26 in uniformly spaced increments into the seed tube or seed conveyor 28. The seeds 62 fall through the seed tube or are conveyed downwardly by the conveyor at a controlled rate of speed to the seed exit 29 and are deposited into the bottom of the V-shaped seed furrow 60. The seeds 62 are then covered with soil and lightly compacted by the furrow closing assembly 40.

Figure 2:
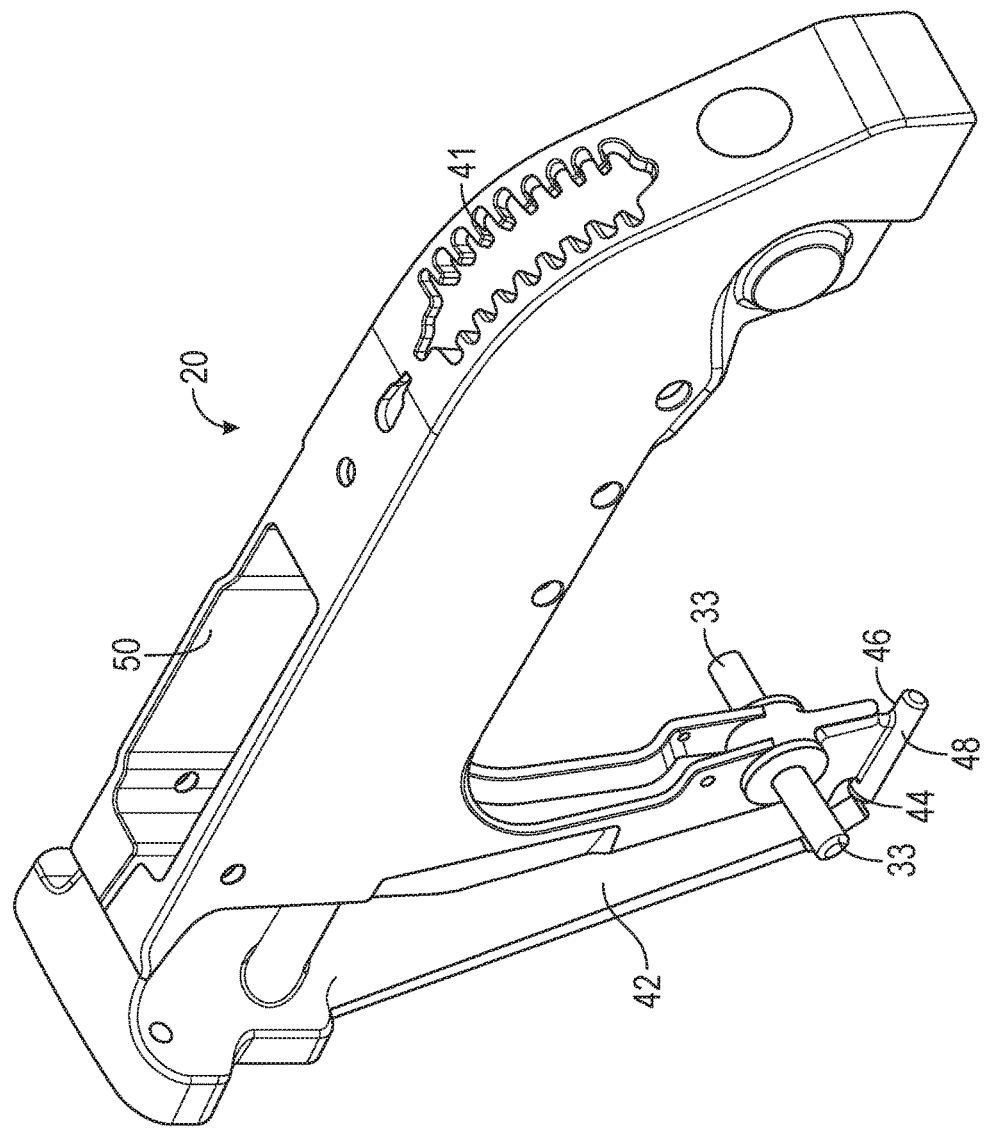
FIG. 2 is a perspective view of the row unit frame member of FIG. 1 with all attachments and assemblies supported therefrom removed.
Figure 3:
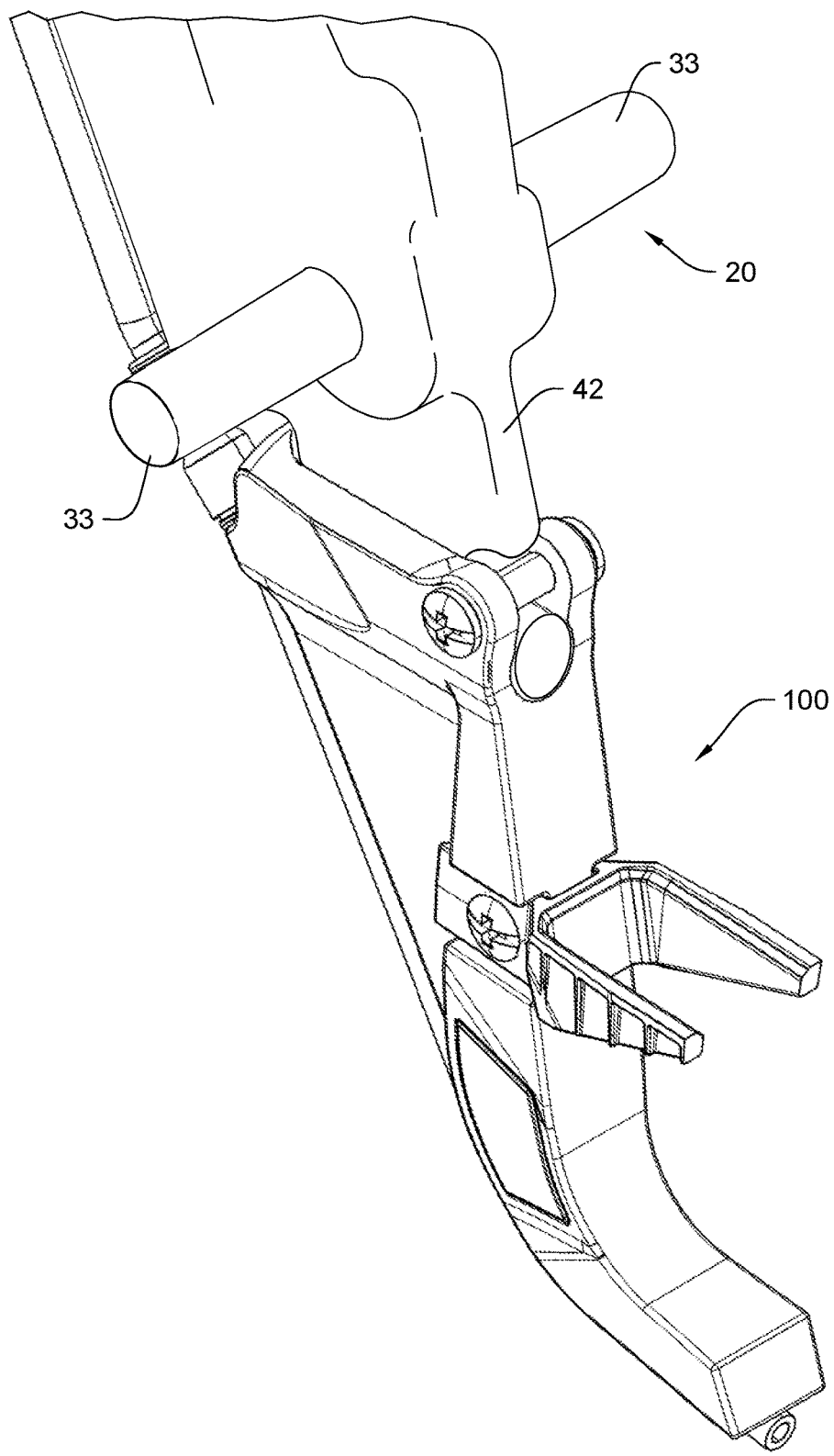
FIG. 3 is an enlarged perspective view of the lower end of the shank and liquid applicator attachment of FIG. 1.
Figure 4:
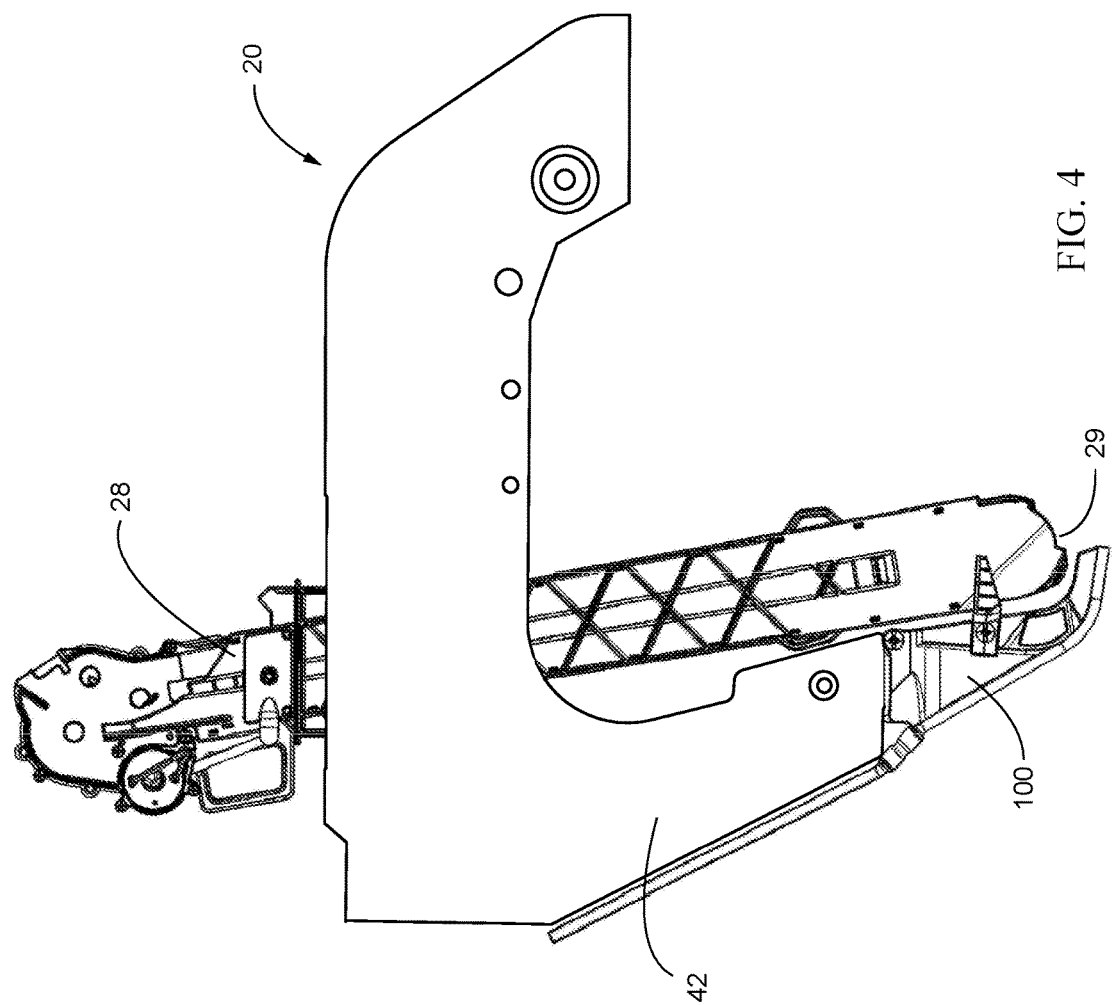
FIG. 4 is an enlarged side elevation view of the row unit frame member of FIG. 1 with the furrow opening assembly and closing wheel assembly removed and showing the liquid applicator attachment mounted to the shank in relation to the seed conveyor.

FIG. 2 is a perspective view of the lower frame member 20 with the furrow opening assembly 30, closing assembly 40 and conveyor 28 removed in order to show the lower end of the shank 42. As can be seen, the lower end of the shank 42 includes forward notch 44 and rearward notch 46 and a cylindrical formation. FIG. 3 is an enlarged perspective view showing an embodiment of the liquid applicator attachment 100 mounted to the lower end of the shank 42. FIG. 4 is a side elevation view of the row unit frame member 20 showing the seed delivery conveyer 28 extending through the opening 50 (FIG. 2) of the lower frame member 20 and showing the liquid applicator attachment 100 mounted to the shank 42 in relation to the seed conveyor 28.

Figure 5:
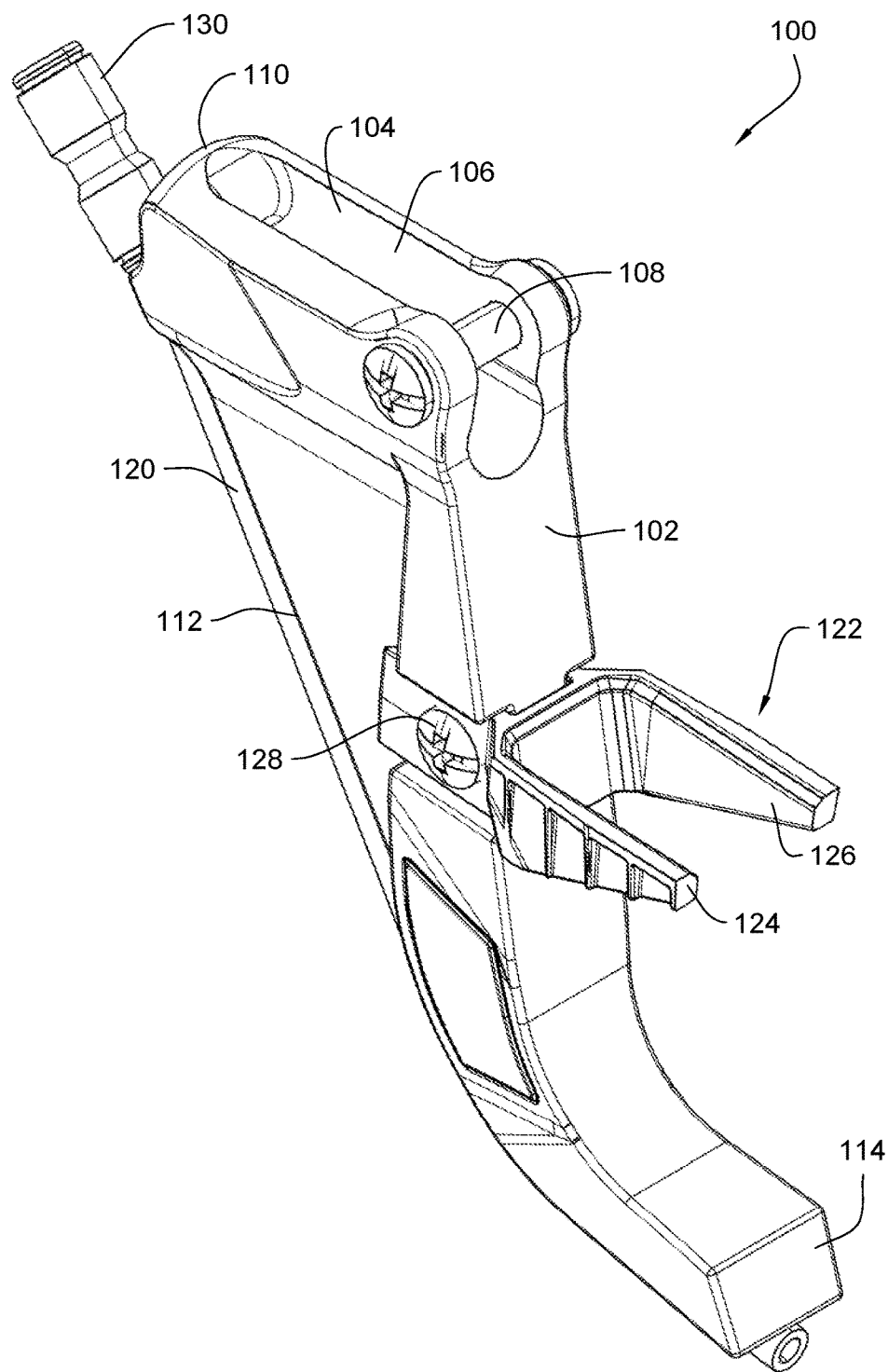
FIG. 5 is a rear perspective view of the liquid applicator attachment of FIG. 4.
Figure 6:
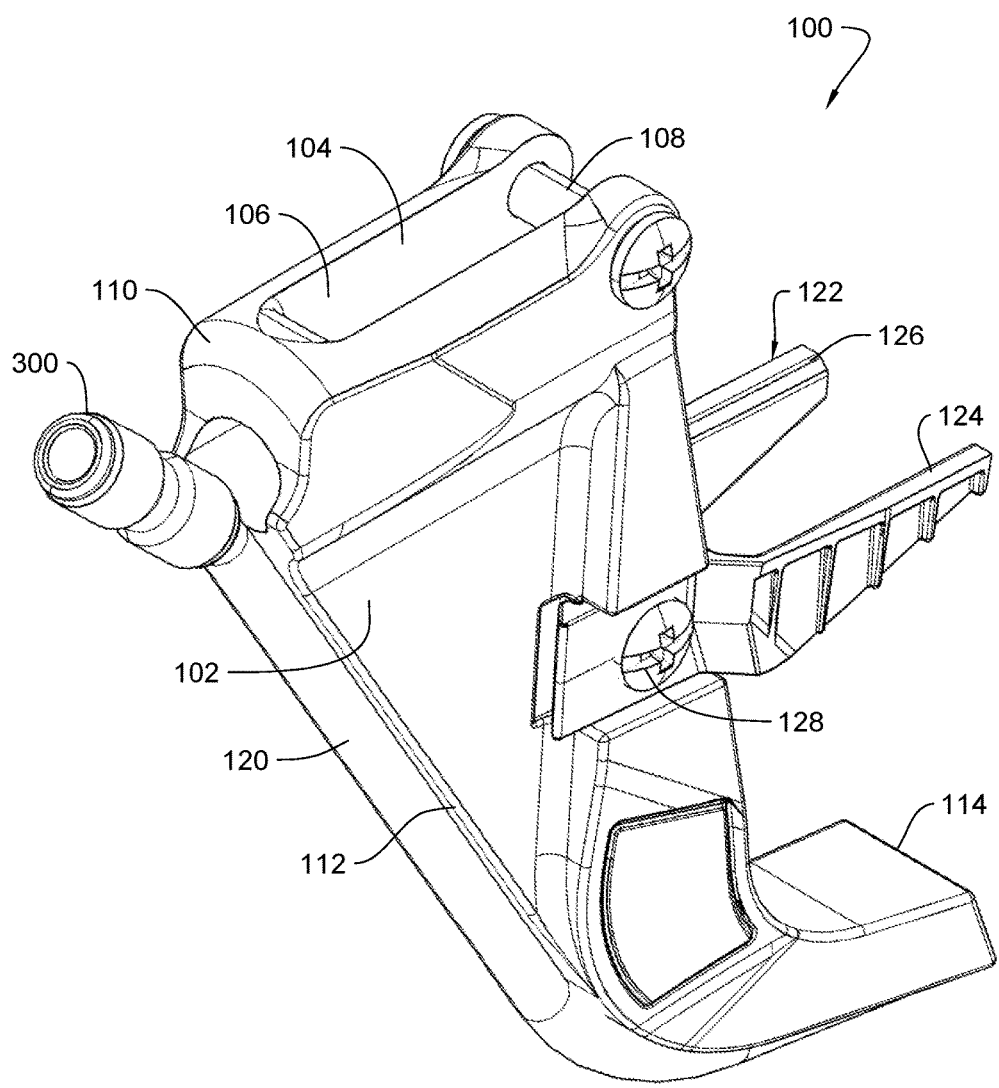
FIG. 6 is a front perspective view of the liquid applicator attachment of FIG. 5.
Figure 7:
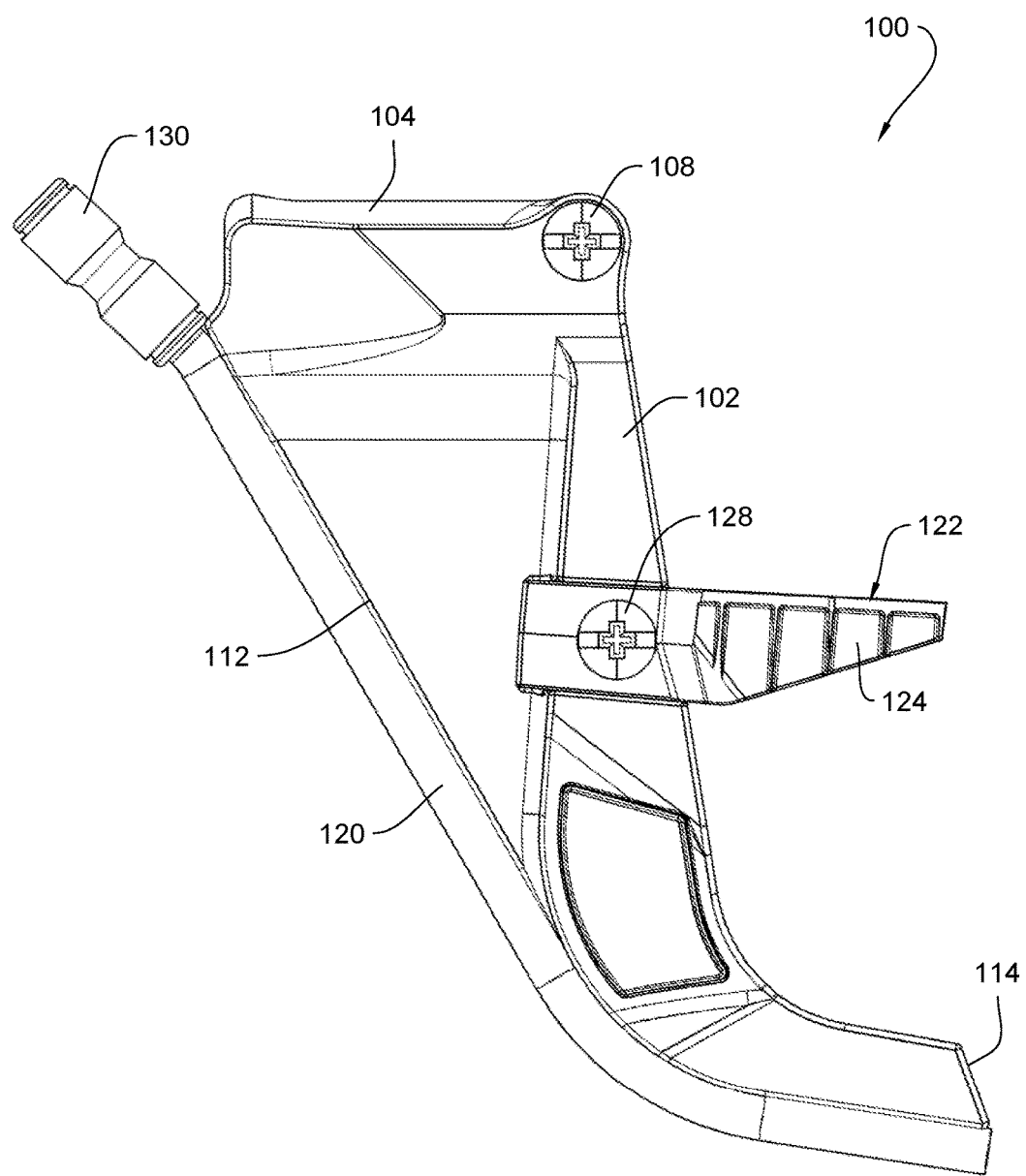
FIG. 7 is a side elevation view of the liquid applicator attachment of FIG. 5.

FIG. 5 is an enlarged rear perspective view of the liquid applicator attachment 100. FIG. 6 is a front perspective view of the liquid applicator attachment 100. FIG. 7 is a side elevation view of the liquid applicator attachment 100. The liquid applicator attachment 100 comprises a main body 102 with an upper shank mount 104. The shank mount 104 comprises a socket 106 configured to matingly receive the cylindrical formation 48 at the lower end of the shank 42 as shown in FIG. 3. A bolt or fastener 108 extends across the rearward end of the shank mount 104 and is received within the rearward notch 46 (FIG. 2) of the shank 42. The rearward end of the shank mount 104 includes a cross-member 110 that is received by the forward notch 44 of the shank 42. When the fastener 108 is tightened, the shank mount 104 is clamped around the lower end of the shank 42 thereby rigidly securing the fertilizer attachment 100 to the shank 42.

The main body 102 has a forward or leading end 112 and a trailing or rearward end 114 that extends downwardly and curves rearwardly from the shank mount 104. The main body 102 supports a conduit 120 along its forward end 112 and along the underside of the rearwardly curving end 114. A bracket 122 is supported from the main body 102 and comprises a pair of bracket arms 124, 126 laterally spaced to frictionally receive the seed delivery apparatus 28, shown as a seed conveyor in FIG. 4. Alternatively, if a seed tube is used in place of the seed conveyor, the seed tube would be frictionally received between the bracket arms 124 and 126. The bracket 122 thereby provides additional support to the lower end of the conveyor or seed tube. The bracket arms 124, 126 may be removably secured to the main body 102 by threaded fasteners 128 so that the bracket arms 124, 126 may be readily replaceable in the event one or both arms 124, 126 break, bend or otherwise wear.

Figure 8:
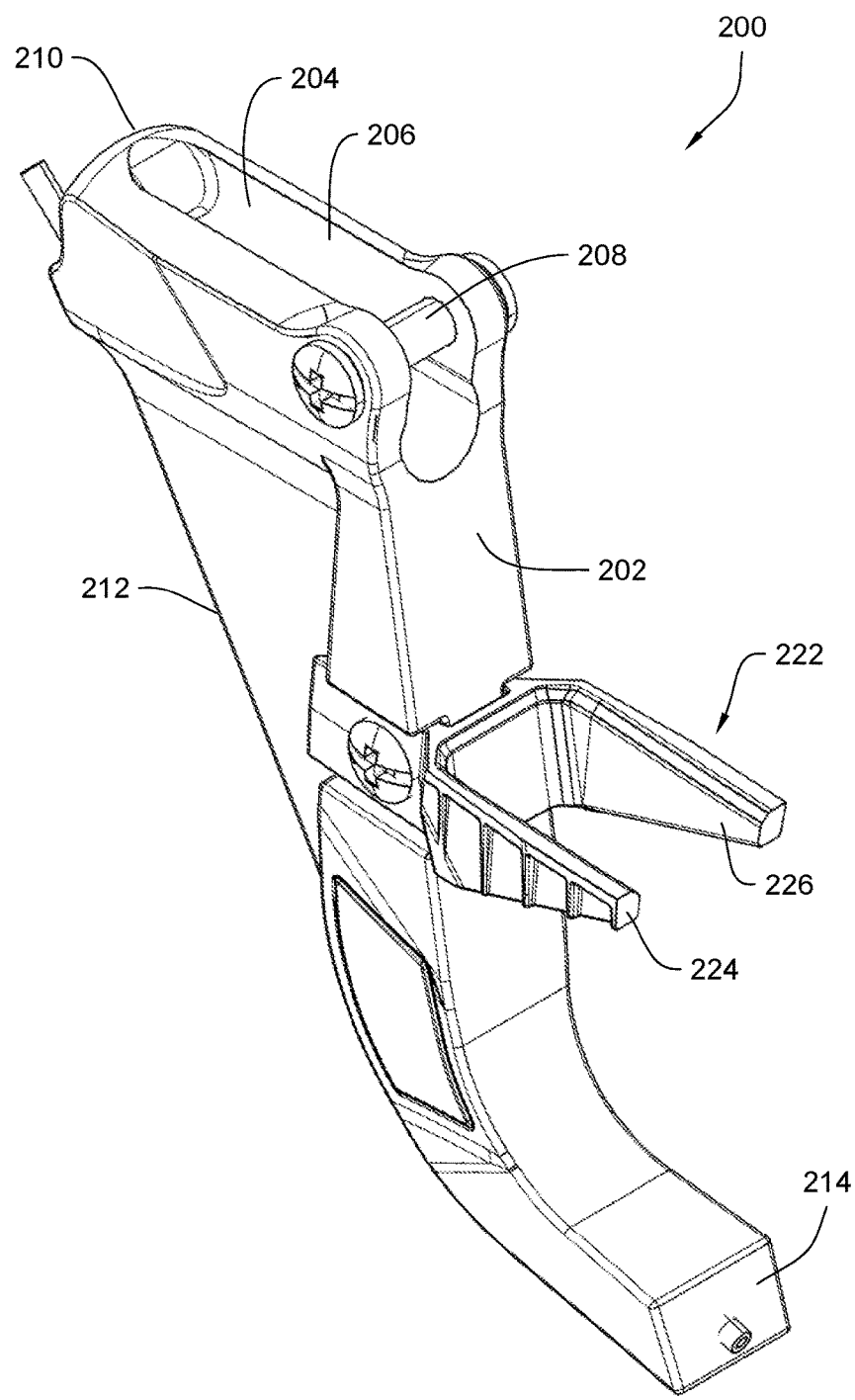
FIG. 8 is a rear perspective view of another embodiment of the liquid applicator attachment.
Figure 9:
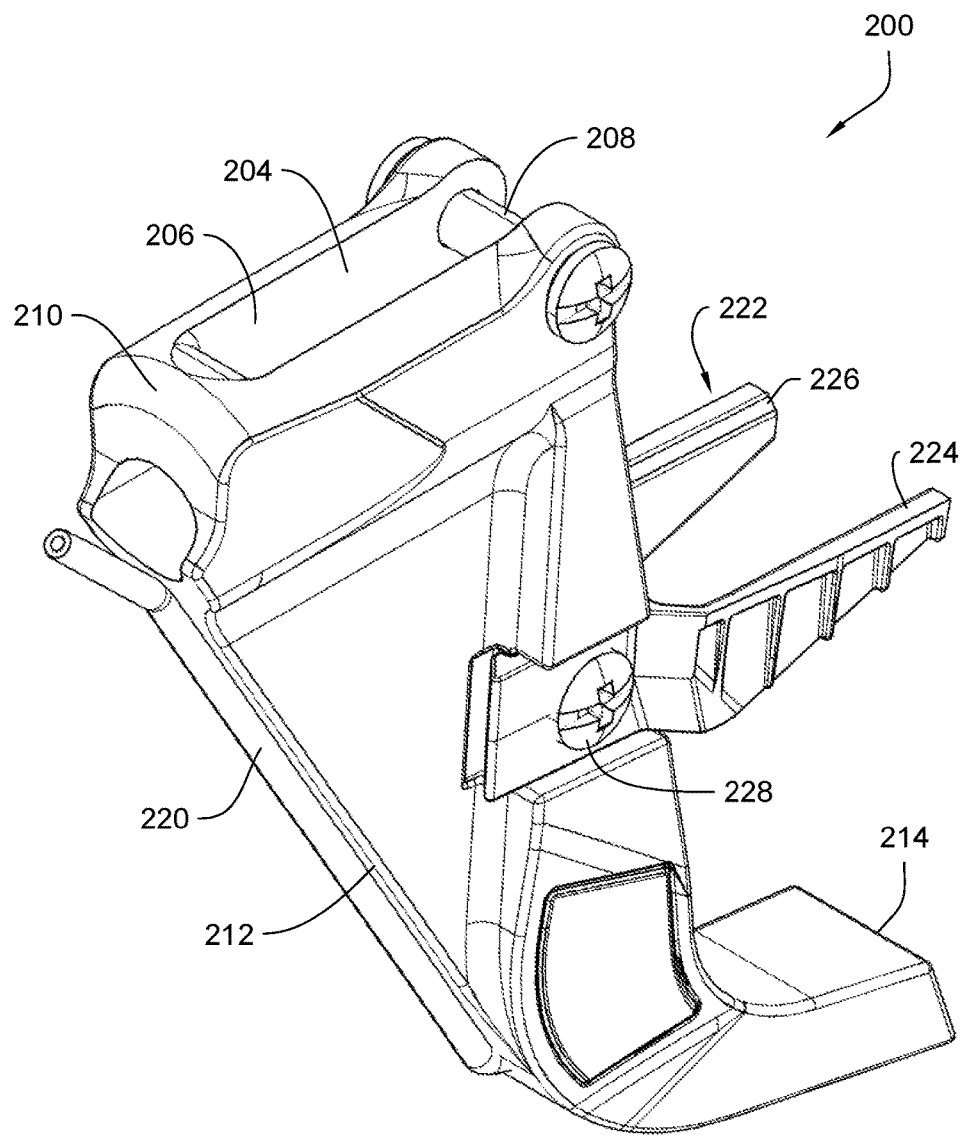
FIG. 9 is a front perspective view of the liquid applicator attachment of FIG. 8.

FIG. 7 is an enlarged rear perspective view of another embodiment of the fertilizer attachment 200. FIG. 8 is a front perspective view of the fertilizer attachment 200 and FIG. 9 is a side elevation view of the fertilizer attachment 200. As with the previous embodiment, the fertilizer attachment 200 comprises a main body 202 with an upper shank mount 204. The shank mount 204 comprises a socket 206 configured to matingly receive the cylindrical formation 48 at the lower end of the shank 42 as shown in FIG. 3. A bolt or fastener 208 extends across the rearward end of the shank mount 204 and is received within the rearward notch 46 in the lower end of the shank 42. The rearward end of the shank mount 204 includes a cross-member 210 that is received by the forward notch 44 of the shank 42. When the fastener 108 is tightened, the shank mount 204 is clamped around the lower end of the shank 42 thereby rigidly securing the fertilizer attachment 200 to the shank 42.

Figure 10:
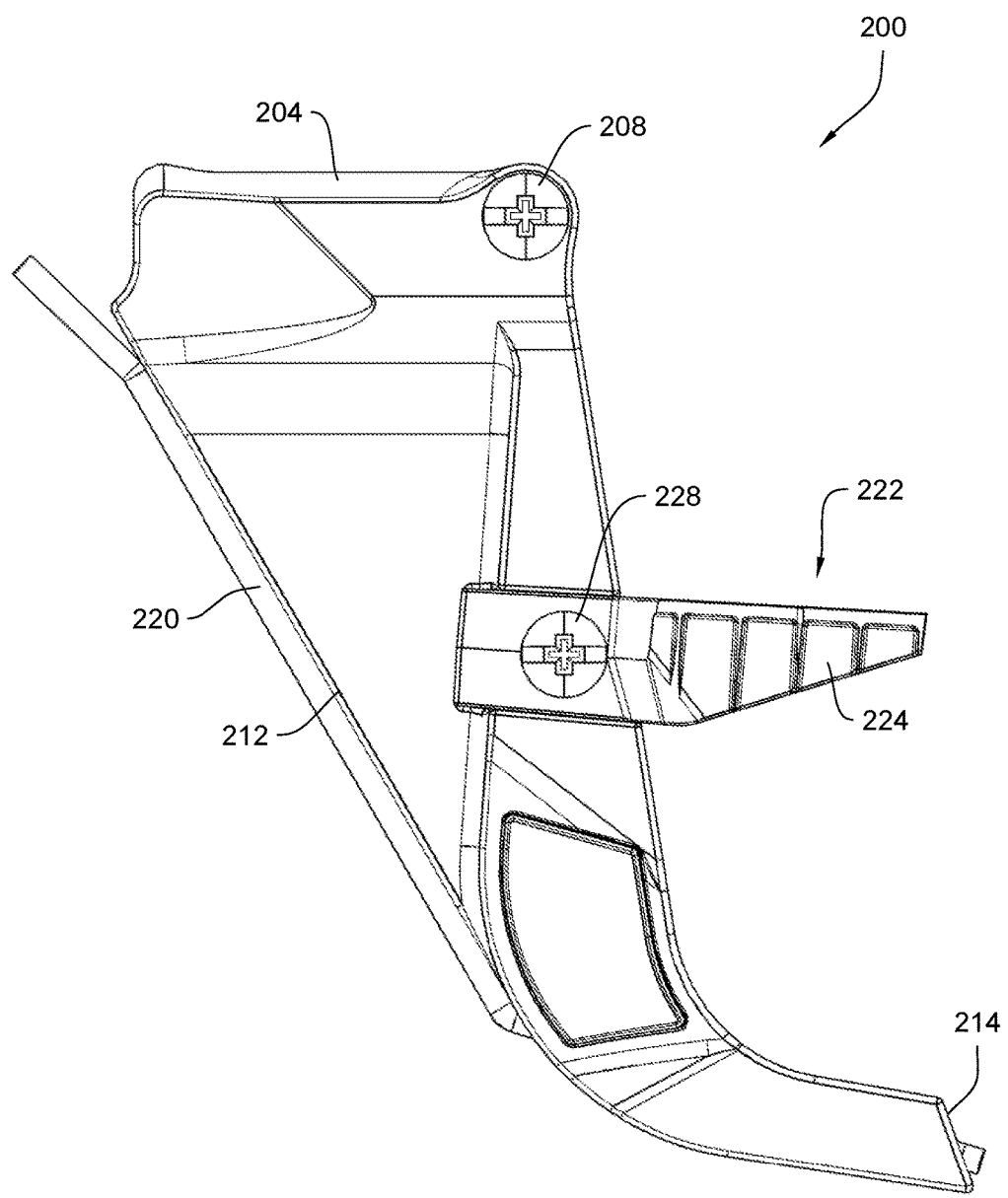
FIG. 10 is a side elevation view of the liquid applicator attachment of FIG. 8.
Figure 11:
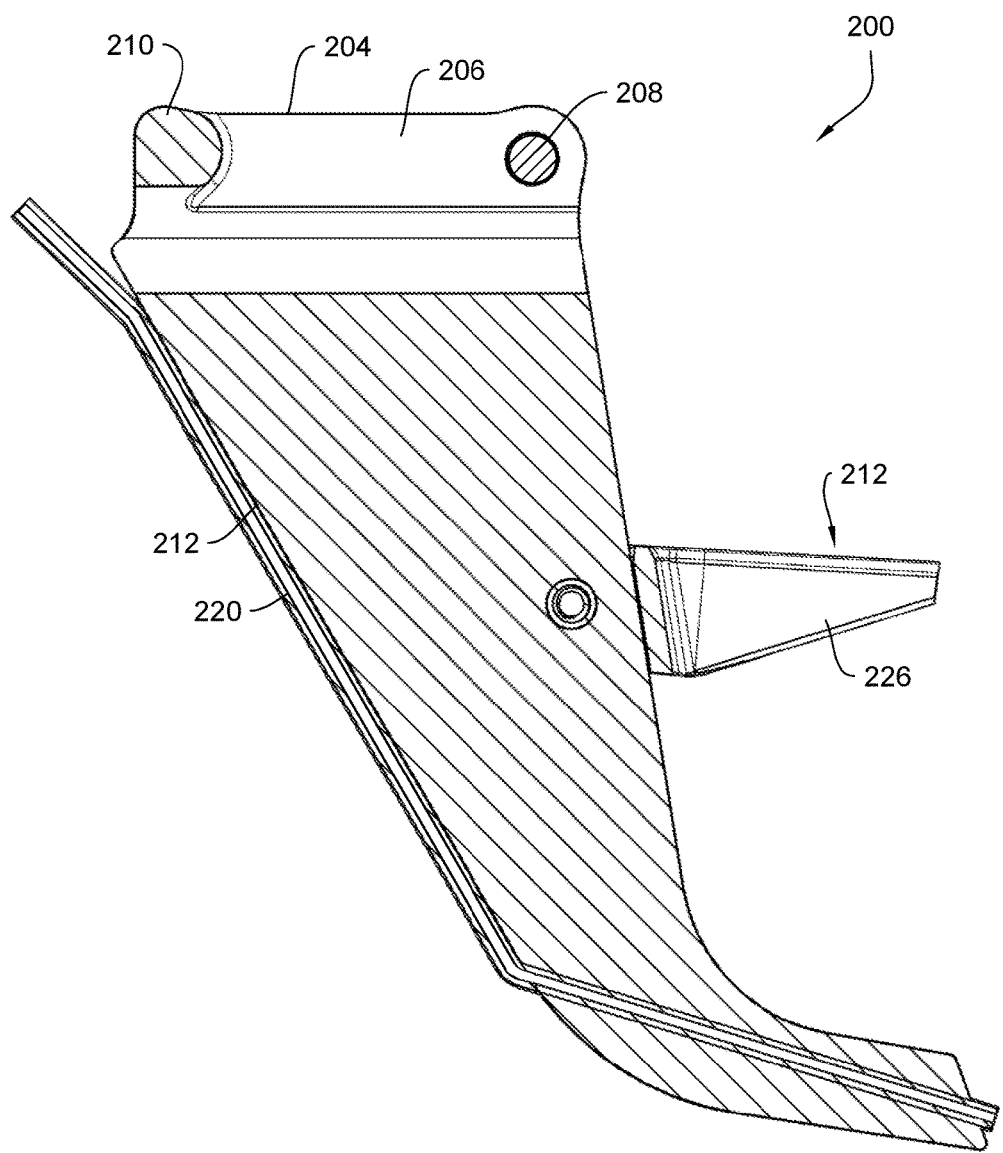
FIG. 11 is a cross-sectional view of the liquid applicator attachment of FIG. 8.

The main body 202 has a forward or leading end 212 and a trailing or rearward end 214 that extends downwardly and curves rearwardly from the shank mount 204. The main body 202 supports a conduit 220 along its forward end 212. However, unlike the previous embodiment, in this embodiment the conduit 220 extends through the main body 202 and out the rearward end 214 as best illustrated in FIG. 10. As with the previous embodiment, a bracket 222 is supported from the main body 202 and comprises a pair of bracket arms 224, 226 laterally spaced to frictionally receive the seed delivery apparatus 28 (e.g., a seed tube or seed conveyor) such as shown in FIG. 4. The bracket 222 thereby provides additional support to the lower end of the conveyor or seed tube. The bracket arms 224, 226 may be removably secured to the main body 202 by threaded fasteners 228 so that the bracket arms 224, 226 may be readily replaceable in the event one or both arms 224, 226 break, bend or otherwise wear.

In both embodiments, the bracket arms 124, 126, 224, 226 may be made of any suitable material, but are preferably made of a resilient plastic material that is sufficiently rigid to frictionally receive and support the conveyor or seed tube to minimize movement or vibration of the lower end of the conveyor or seed tube as the planter traverses the field.

The main body 102, 202 of both embodiments may be made from steel, aluminum or any other suitably rigid material and may be formed by casting or fabricated from individual parts that are welded or otherwise attached together.

The rigid conduits 120, 220 may be attached to the leading ends 112, 212 of the respective fertilizer attachments 100, 200 by any mechanical connector or the conduits 120, 220 may be integrally formed with the main body 102, 202. The upper end of the conduits 120, 220 may include a coupler 300 to permit easy attachment to a rigid or flexible supply tube (not shown) which communicates the liquid from a liquid supply source mounted to the planter or to the tractor pulling the planter. Alternatively, a flexible hose in communication with the liquid supply source may pass through the rigid conduits, 120, 220.

It should be appreciated that that liquid applicator attachment 100, 200 is disposed between the furrow opener discs 32 of the furrow opening assembly 30 and forward of the seed delivery apparatus 28, whereby the liquid is deposited into the open seed furrow 60 by the conduits 120, 220 forward of the seed delivery apparatus.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A liquid applicator attachment for a planter row unit, the planter row unit having a seed delivery apparatus and a shank supporting a pair of furrow opening discs disposed to form a seed furrow in a soil surface, the liquid applicator attachment comprising:
   a main body having a socket portion adapted to removably, rigidly mount to a lower end of the shank between the furrow opening discs and forward of the seed delivery apparatus relative to a direction of travel of the planter row unit, the main body having a forward end and a rearward end;
   a rearwardly extending bracket to frictionally receive a portion of the seed delivery apparatus, wherein the seed delivery apparatus is a seed conveyor, the forward end of the main body extending downwardly from the socket portion along a forward side of the seed delivery apparatus, the main body curving rearwardly toward the trailing end under a lower end of the seed delivery apparatus, the rearward end terminating forwardly of a seed exit of the seed delivery apparatus; and
   a liquid conduit supported by the main body, the liquid conduit in fluid communication with a liquid source and disposed to deposit liquid into the seed furrow forward of the seed exit of the seed delivery apparatus.

2. The liquid applicator attachment of claim 1, wherein the socket portion engages a forward portion and a rearward portion of the shank.

3. The liquid applicator attachment of claim 1, wherein the rearwardly extending bracket comprises laterally spaced first and second arms which frictionally receive and engage opposing sides of the seed delivery apparatus.

4. The liquid applicator attachment of claim 1, wherein the liquid conduit extends under and curves rearwardly with the main body.

5. The liquid applicator attachment of claim 1, wherein the liquid conduit extends under and curves rearwardly with the main body, and wherein the liquid conduit is disposed to dispense liquid rearwardly under the seed delivery apparatus and forward of the seed exit of the seed delivery apparatus.

6. The liquid applicator attachment of claim 1, wherein the liquid conduit extends through the main body.

* * * * *